United States Patent [19]
Rau

[11] Patent Number: 5,821,768
[45] Date of Patent: Oct. 13, 1998

[54] RECEIVER CIRCUIT WITH CONSTANT INPUT IMPEDANCE

[75] Inventor: Martin Rau, München, Germany

[73] Assignee: Deutsche Thomson-Brandt GmbH, Villingen-Schwenningen, Germany

[21] Appl. No.: 686,285

[22] Filed: Jul. 25, 1996

[30] Foreign Application Priority Data

Sep. 8, 1995 [DE] Germany .................. 195 33 274.1

[51] Int. Cl.$^6$ ............................................. H03K 17/16
[52] U.S. Cl. ............................................. 326/31; 326/30
[58] Field of Search .................. 326/31, 30, 90, 326/26; 333/22 R

[56] References Cited

U.S. PATENT DOCUMENTS

| | | | |
|---|---|---|---|
| 3,573,489 | 4/1971 | Sramek | 326/26 X |
| 5,363,332 | 11/1994 | Murabayashi | 365/189.08 |
| 5,412,262 | 5/1995 | Nishio et al. | 326/64 |

FOREIGN PATENT DOCUMENTS 3345496  7/1985  Germany .

OTHER PUBLICATIONS

Kawamura, T. et al.: An Extremely Low–power Bipolar Current–mode I/O Circuit for Multi–Gbit's Interfaces. In: 1994 Symposium on VLSI Circuits Digest of Technical Papers, S. 31,32.

Murabayashi, F. et al., 3.3–V BiCMOS Circuit Techniques for A 120–mHz Microprocessor. In: IEEE Journal of Solid–State Circuits, vol. 29, No. 3, Mar. 1994 S. 298–302.

Primary Examiner—David C. Nelms
Assistant Examiner—Hoai V. Ho
Attorney, Agent, or Firm—Joseph S. Tripoli; Frederick A. Wein

[57] ABSTRACT

For interference-free transmission of high-frequency signals, the receiver must be terminated with the characteristic impedance of the transmission line. This can be achieved by a single base-connection circuit, but in this case the input impedance is dependent on the current flow and is therefore not exactly constant. Adding a second base-connection circuit makes the circuit symmetrical, so that opposite effects are canceled, which makes the input impedance constant. Production in both bipolar technology and in MOS technology is possible.

17 Claims, 3 Drawing Sheets

RECEIVER CIRCUIT WITH CONSTANT INPUT IMPEDANCE

FIELD OF THE INVENTION

The invention relates to an electronic circuit for receiving and/or processing signals, in particular digital signals, where the circuit has constant input impedance.

BACKGROUND OF THE INVENTION

As a result of the technical progress in signal processing, and with the integration of electronic circuit parts or circuits, an ever-increasing number of digital signals with ever-increasing clock frequencies are transmitted between such circuits. This means that, for interference-free transmission of high-frequency signals, the receiver must be terminated with the characteristic impedance of the transmission line, since otherwise cable reflections which may cause interference can occur, the characteristic impedance being between 30 and 300 Ω. By way of example, the characteristic impedance in the case of connections between chips on simple double-sided boards, which are relatively inexpensive, is between 80–120 ohms, whereas in the case of multilayer-technology boards for connecting chips fitted on the board it is approximately 50 ohms. The simplest case of such a waveguide termination is formed by a correspondingly accurate fixed-value resistor which corresponds to the characteristic impedance. However, owing to the fabrication technology, it is not possible to construct a correspondingly precise resistor on or in an IC, since the tolerances associated with fabrication are too great in the production of a resistor on a chip.

As a result of the relatively small line impedance, the incoming voltage signal level is relatively low. By means of a transistor base-connection circuit, the received signal current, applied to the emitter, is used directly for amplification and the base-connection circuit furthermore produces an input impedance of the correspondingly small order of magnitude. Such a base-connection circuit is disclosed, for example, by Kawamura et al., "An extremely low-power bipolar current-mode I/O circuit for multi-Gbit/s interfaces", Symposium on VLSI circuits digest of technical papers 1994, pages 31–32, and Murabayashi, F. et al.: "3.3-V BiCMOS circuit techniques for a 120-MHz RISC microprocessor", Journal of solid-state circuits, March 1994, pages 298–302. In this case, a transistor in base-connection mode is arranged at the input and its base is kept at a constant voltage by means of a constant-voltage source. As a result of the collector current of the transistor, using a load resistor in the collector circuit produces an output signal which is processed in a subsequent circuit. The advantages of the base-connection circuit reside in its low input impedance and its high cut-off frequency.

A disadvantage of the base-connection circuit is that its input impedance is dependent on the current flow and is therefore not completely constant.

The object of the invention is thus to provide a receiver circuit with constant input impedance.

The object is achieved by the subject-matter of the invention according to the present claim. Advantageous developments of the invention are given in the subclaims.

SUMMARY OF THE INVENTION

The present invention comprises a receiver circuit with constant input impedance, which has an upper transistor, in base-connection mode (i.e. commmon base configuration), to the emitter of which the signal is applied and the base of which is supplied with a constant voltage, and a load resistor, located in the collector circuit and connected to an upper potential, for producing the voltage output signal, a second, lower transistor being connected with its emitter-collector path between the upper transistor and a lower potential. Accordingly, when MOS transistors are used, a gate-connection circuit (i.e. common gate configuration) is employed, the lower transistor being connected with its source-drain path between the upper transistor and the lower potential.

In this case, in a first embodiment, the lower transistor of the receiver circuit according to the invention is complementary to the upper transistor, so that, when a second, lower load resistor is used in the collector circuit of the lower transistor, it is possible to tap a second output signal which is the inverse of the first. Combining the known common base circuit with its complement achieves the advantageous effect that the opposite behaviour characteristics of the two transistors mutually cancel, and an approximately constant input impedance is thus achieved in a desired excursion range.

If the second load resistor is omitted, then the two transistors of the circuit according to the invention can be chosen to be identical. This increases the circuit symmetry and the circuit speed is no longer limited by the slow complementary PNP type. In this case, the lower transistor is connected as a diode.

Furthermore, in the circuit according to the invention, two negative-feedback resistors are connected between the two transistors, that is to say between the emitter of the upper transistor and the collector of the lower transistor and, in the bipolar variant, these resistors serve to increase the current range within which the input impedance is approximately constant. The signal input is located between the two negative-feedback resistors. It is also possible to arrange the second negative-feedback resistor between the second transistor, connected as a diode, and the lower potential.

For the bipolar circuit, the two negative-feedback resistors are chosen to have approximately the same resistance. The optimum value of the overall negative-feedback resistance, consisting of the negative-feedback resistance and the parasitic impedances of the transistor, is approximately equal to ⅔ of the input impedance. In other words, the negative-feedback resistance should be correspondingly chosen while taking into account the parasitic emitter and base impedance. It is therefore also possible that, because of the parasitic impedances of the transistors, one or both of the negative-feedback resistors must be omitted. The circuit described so far, consisting of the two transistors and the two negative-feedback resistors, is referred to as the signal branch.

In order to achieve an approximately constant input impedance of the upper transistor, the base voltage of the upper transistor must be constant. It is possible to keep the base voltage of the upper transistor constant by using a copy of the circuit, that is to say of the signal branch, the lower end of which is at the lower potential and which has a constant quiescent current $I_O$ applied to it. This copy of the signal branch, which is for producing the quiescent current, is referred to as the mirror branch. In this case, the upper transistor of the reference branch is likewise connected as a diode. A constant current (quiescent current) is passed through this mirror branch. If no current is applied to the signal input, this quiescent current $I_O$ likewise flows in the signal branch. As a result of the short-circuiting of the base and emitter of the upper transistor of the mirror branch, a constant voltage is applied to the base of the upper transistor of the signal branch.

Both bipolar and MOS transistors can be used for producing the circuit according to the invention, and, in the bipolar variant, because of the temperature dependence of the transistor behaviour, the quiescent current is produced by a "PTAT" current source (PTAT=Proportional To Absolute Temperature), so that the quiescent current is proportional to the absolute temperature.

It may be advantageous when producing the circuit with MOS transistors for the negative-feedback resistors to be omitted. In this case, the circuit may have an additional amplifier, with a reference resistor and a reference voltage, which controls the quiescent current $I_O$ such that the equation $$U_O = U_{REF} + R_{REF} \cdot I_O$$

is satisfied, it being possible for the additional amplifier to be formed essentially by a differential amplifier.

It is furthermore possible to supplement both the bipolar and the MOS variants by a further copy of the signal branch, which is referred to as the reference branch and is arranged between the signal branch and the mirror branch, the base (or the gate) of the upper transistor of the reference branch likewise having the constant voltage of the mirror branch applied to it. The output signal is tapped between the collectors of the upper transistors of the signal and reference branches. In this way, the sign of the incoming signal current can advantageously be recognized reliably even for extremely small currents.

BRIEF DESCRIPTION OF THE DRAWINGS

The invention is explained in more detail below with the aid of a number of illustrative embodiments, with reference to the drawings, in which:

FIG. 6 shows the known base-connection circuit (common base configuration), consisting of a transistor $T_1$ and a load resistor $R_L$, connected in the collector circuit, at which the signal $U_{OUT1}$ is tapped. Although the input impedance $R_{IN}$ produced between the emitter and the base is small, it is dependent on the current flow and is therefore not constant. The base of the transistor $T_1$ is supplied with constant voltage by a constant-voltage source.

FIG. 1 shows a first embodiment of the invention, in which the known base-connection circuit is supplemented by a base-connection circuit which is complementary to it, so that the output voltage $U_{OUT1}$ and its inverse $U_{OUT2}$ can respectively be tapped at the upper load resistor $R_L$ and the lower load resistor $R_L$. The fluctuations in the input impedance in the upper base-connection circuit formed by the transistor $T_1$ are balanced by opposite fluctuations in the circuit with the transistor $T_2$ which is complementary to it, so that the effects counteract each other and the current dependence of the input impedance $R_{IN}$ is exactly negated for a particular input current and is at least approximately constant for small excursions.

Figure 1:
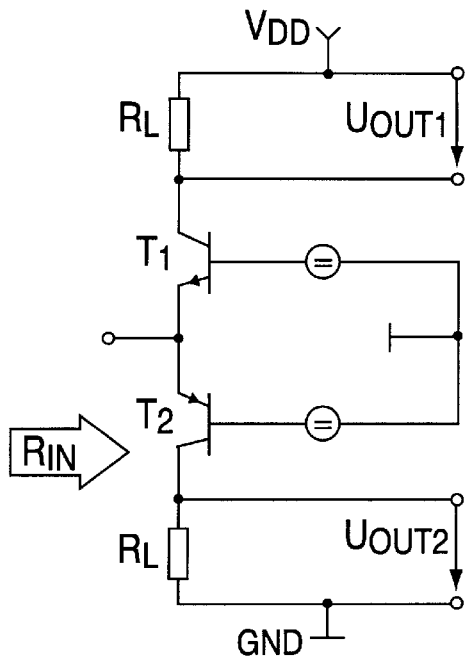
FIG. 1 shows the circuit diagram of a first embodiment of the invention, with the use of a transistor and its complement.

Since the two outputs $U_{OUT1}$ and $U_{OUT2}$ deliver identical signals, one of the outputs is unnecessary. It is therefore possible to remove the associated working resistance, in this case $R_{L2}$, and thereby simultaneously increase the voltage amplitude possible at the other output, and correspondingly the usability of the circuit at reduced supply voltages. Since, for technological reasons, the NPN transistor is superior to the PNP transistor, the output $U_{OUT2}$ in the lower part of FIG. 1 is omitted in preference. It is then possible to use the much simpler and less expensively produceable PNP substrate instead of an isolated PNP transistor.

Figure 2:
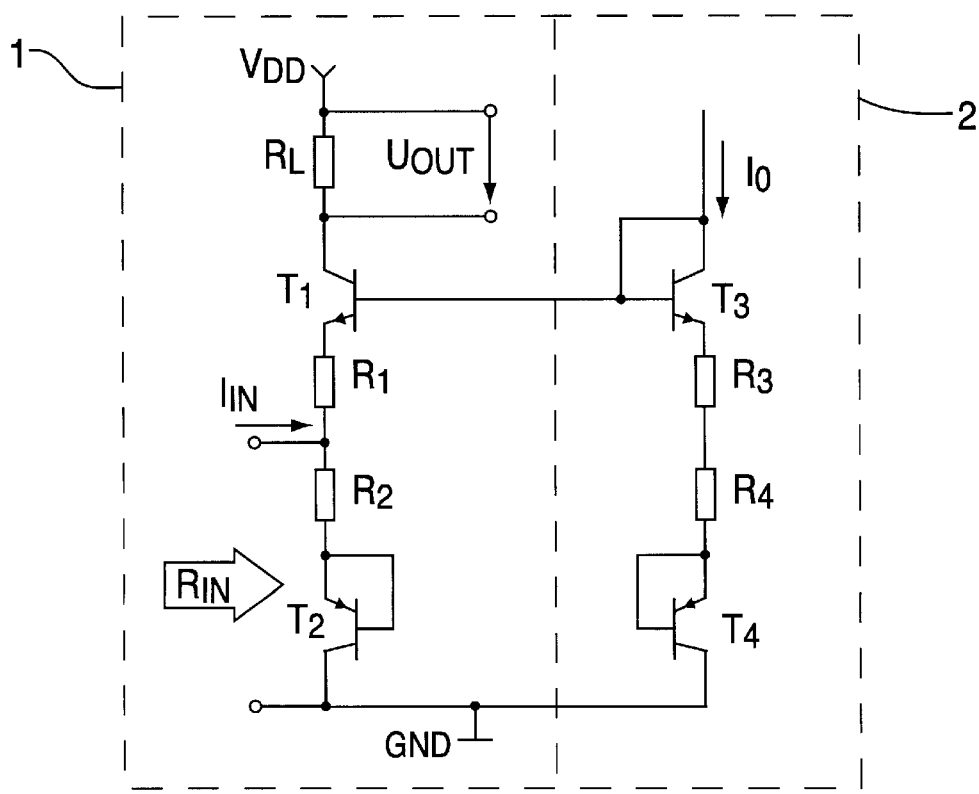
FIG. 2 shows a second bipolar embodiment of the invention, with identical transistors.

FIG. 2 shows a second embodiment of the invention. Although, by using the complementary PNP transistor $T_2$ in the circuit corresponding to FIG. 1, the DC input impedance is improved, the frequency range of the circuit is nevertheless reduced because of the lower transit frequency of the PNP transistor. For this reason, in the circuit according to FIG. 2, the complementary transistor $T_2$ is replaced by a transistor $T_2$ which is identical to the transistor $T_1$, that is to say of the same type, which is possible by virtue of the omission of the lower load resistor $R_L$, since the current-voltage characteristic of the base-emitter circuit is the same for PNP and NPN transistors in the absence of a load resistor. Furthermore, the transistor-specific current-voltage characteristic between the input node and a constant potential at the base is decisive for the function of the base-connection circuit. Since the collector is then at a constant potential, this function can likewise be fulfilled by the NPN transistor $T_2$ which is connected as a diode, so that the base of the transistor $T_2$ is now at the collector potential. Furthermore, using identical transistor types for the transistors $T_1$ and $T_2$ produces symmetrical circuit behaviour. As a result of the high transconductance of the transistors, the bipolar variant represented in FIG. 2 is particularly suitable for small signals (approximately 100 mV) . It permits very-low-power data transmission, but requires correspondingly low interference or screening from interference.

Two symmetrically located suitable negative-feedback resistors $R_1$, $R_2$ are required for achieving a constant input impedance. The magnitude of the overall negative-feedback resistance, consisting of the negative-feedback resistance $R_1$, $R_2$ and the parasitic transistor impedances, is approximately equal to $\frac{2}{3}$ of the input impedance $R_{IN}$, as can be shown analytically (not represented). This means that the negative-feedback resistor $R_1$, $R_2$ which should actually be used must take into account the parasitic impedances. The input impedance of this circuit is approximately constant if both transistors are of approximately the same dimensions. As a result of the circuit symmetry, the characteristic curve of the differential input impedance is approximately symmetrical with the input current around the working point $I_{IN}=0$, when second-order effects such as, for example, the "early effect" are neglected. Since, as a rule, transistors do not behave ideally, the symmetry is not complete owing to second-order effects. If the negative-feedback resistors $R_1$ and $R_2$ are chosen with somewhat unequal resistances, the second-order effects can be reduced, which increases the symmetry of the characteristic curve.

The voltage of the base of the transistor $T_1$ must be kept constant for operating the circuit according to the invention. To do this, a constant quiescent current $I_O$ is impressed in a circuit copy constituted by the mirror branch 2. This copy 2 of the signal branch 1 comprises the transistors $T_3$ and $T_4$, which correspond to the transistors $T_1$ and $T_2$, and the resistors $R_3$ and $R_4$, which correspond to the negative-feedback resistors $R_1$ and $R_2$. The mirror branch 2 is in parallel with the signal branch 1, the two bases of the transistors $T_1$ and $T_3$ of the two branches 1, 2 being connected together. Both branches are at the same lower potential GND. At the top, the branches are at an upper potential $V_{DD}$ which is supplied at the point Y. By virtue of the base-collector short-circuit of the transistor $T_3$ of the mirror branch 2, the base of the transistor $T_1$ is at a constant voltage.

The value of the input impedance is a function of the impressed quiescent current $I_O$ and of the negative-feedback resistor $R_1$, $R_2$, the quiescent current $I_O$ being set independently of component tolerances, in accordance with the current-mirror principle mentioned above. After the circuit has been fabricated, that is to say after the end of the production process, the values cannot be changed without deviating from optimum functioning.

As a result of the temperature-dependent behaviour of the transistors, in the bipolar circuit according to FIG. 2 the quiescent current $I_O$ must be proportional to the absolute temperature in order to produce a constant input impedance. The production of a current which is proportional to the absolute temperature is referred to by the term of the art "PTAT" current source and therefore requires no further explanation here.

Figure 3:
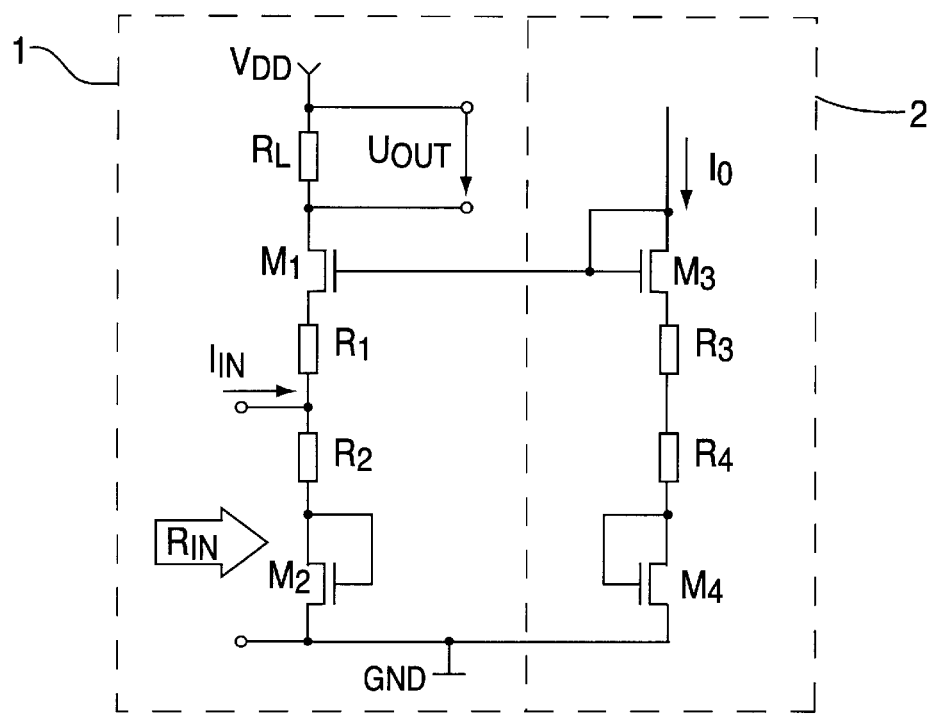
FIG. 3 shows a third embodiment of the invention, with the use of MOS transistors.

FIG. 3 shows a third embodiment of the circuit according to the invention, MOS transistors $M_1$, $M_2$, $M_3$, $M_4$ being used instead of the bipolar transistors $T_1$, $T_2$, $T_3$, $T_4$. The circuit layout is in this case identical to the bipolar variant according to FIG. 2. As in the case of the circuit according to FIG. 2, the MOS variant comprises the transistors $M_1$ and $M_2$ in gate-connection (common gate configuration) mode, with the impression of the constant quiescent current $I_O$ being achieved here once again by a copy of the circuit. The copy of the signal branch 1, referred to as the mirror branch 2, comprises the transistors $M_3$ and $M_4$ as well as the negative-feedback resistors $R_3$ and $R_4$. The negative-feedback resistors $R_1$ and $R_2$, represented in FIG. 3, are not absolutely necessary in the MOS variant and can therefore be omitted. If they are omitted, then the corresponding resistors in the mirror branch must also be omitted. However, the negative-feedback resistors represent some degree of protection for the critical gate-source connection of the transistor $M_2$, since the gate of the transistor $M_2$ is directly connected to the signal input. Likewise, the relationship $R_1 \sim \frac{2}{3} R_{IN}$ does not hold for the MOS circuit. In the case of the MOS variant as well, fitting unequal negative-feedback resistors can approximately balance out the second-order effects and increase the symmetry of the circuit.

Figure 4:
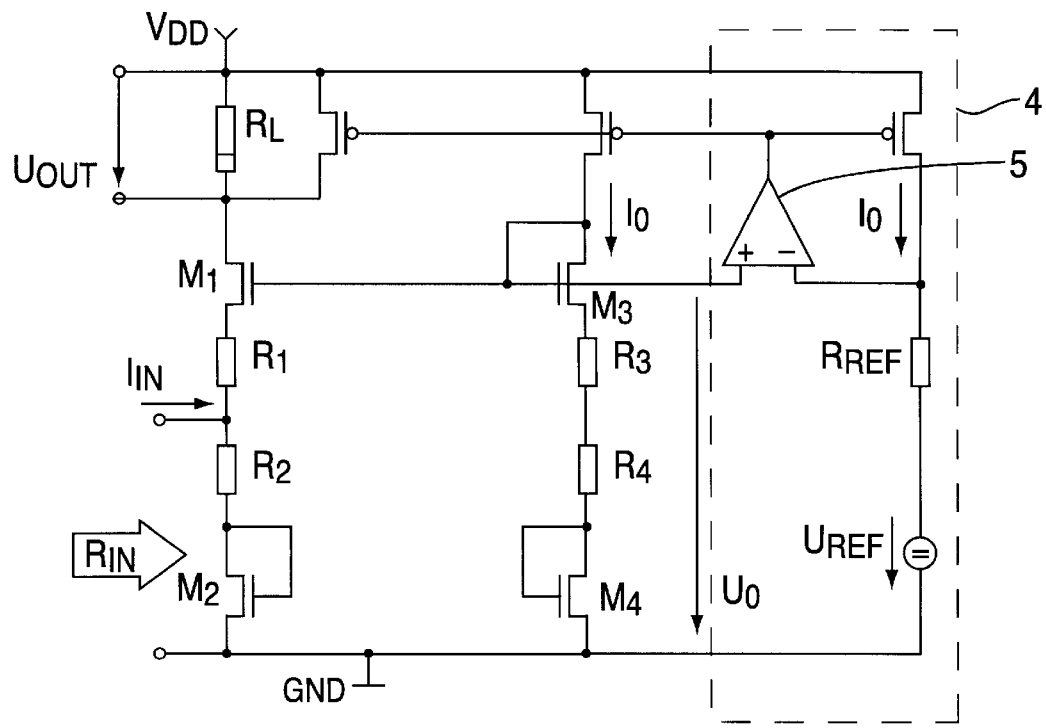
FIG. 4 shows a circuit corresponding to FIG. 3, with an additional amplifier part.

FIG. 4 shows the circuit in FIG. 3, supplemented by an amplifier branch. As a result of the significant deviation, associated with fabrication, in the parameters of the MOS transistors $M_1$ and $M_2$, additional measures must be taken in the case of the MOS circuit, that is to say the additional amplifier branch. The schematically indicated amplifier controls the quiescent current such that the equation $U_O = U_{REF} + R_{REF} \cdot I_O$ is satisfied. With this linear law, it is possible to obtain good compensation for the influence of the parameters of the NMOS transistors on the input impedance $R_{IN}$. In order to compensate for temperature, $U_{REF}$ must decrease with increasing temperature. The amplifier may be produced with a conventional operational amplifier. The circuit which is represented is dependent in principle neither on the PMOS parameters nor on the supply voltage. In order to reduce the power consumption, the quiescent currents for the control in the amplifier and in the reference branch are chosen to be very small, since it is not necessary to balance out rapid changes. By virtue of the current source connected in parallel with the load resistor, which is proportional to $I_O$, the voltage gain of the stage can in turn be chosen to be higher.

Figure 5:
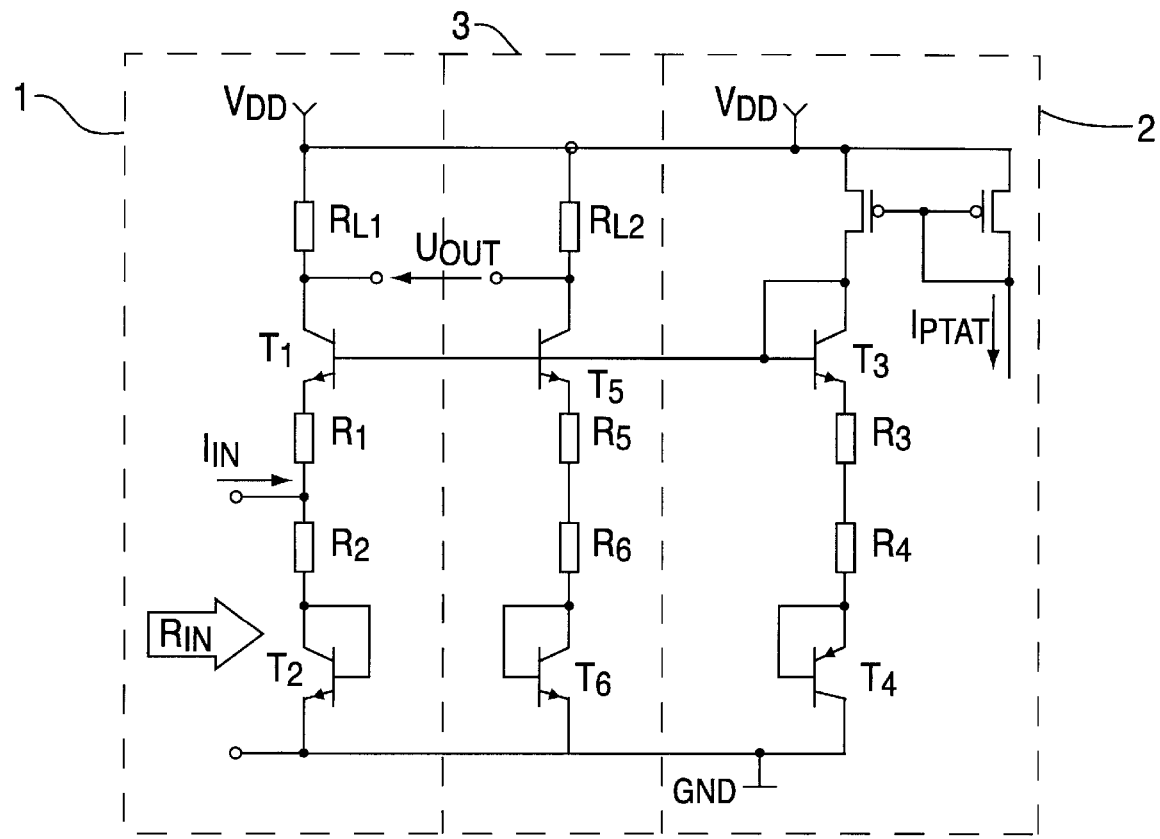
FIG. 5 shows a circuit according to FIG. 2 or 3, which is supplemented by a symmetry branch.
Figure 6:
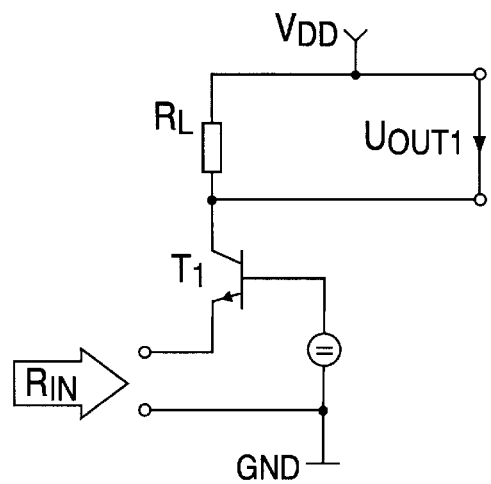
FIG. 6 represents a known base-connection circuit.

FIG. 5 shows a symmetrical supplement to the circuit according to FIG. 2 by a reference branch 3 which is identical to the signal branch 1 and is arranged between the latter and the mirror branch 2. Like the signal branch 1, the symmetry branch 3 comprises a load resistor $R_L$, an upper transistor $T_5$ in base-connection mode, two negative-feedback resistors $R_5$, $R_6$ and a lower transistor $T_6$, connected as a diode. The base of the transistor $T_5$ is kept at a constant potential by the mirror branch 2. The impressed current $I_O$ of the mirror branch 2 always flows through the reference branch, since the reference branch 3 does not have a signal input. The output signal $U_{OUT}$ of this circuit is then tapped between the collectors of the transistors $T_1$ and $T_5$, which are connected to the upper potential $V_{DD}$ via load resistors $R_{L1}$ and $R_{L2}$. Operation is as follows:

In the absence of a signal input current $I_{IN}$, the output signal $U_{OUT}$ is zero, since the quiescent current $I_O$ flows through both the signal branch 1 and the reference branch 3, and both terminals are consequently at the same potential. In the case of a positive signal input current $I_{IN}$, the current through the transistor $T_1$ is less, as a result of which the voltage at $R_{L1}$ decreases. However, the voltage at $R_{L2}$ remains the same, as a result of which the output voltage $U_{OUT}$ becomes negative. In the case of a negative signal input current, the corresponding responses are reversed, so that the sign of $U_{OUT}$ is correspondingly reversed and the output voltage $U_{OUT}$ becomes positive.

In other words, the output signal $U_{OUT}$ is symmetrical with respect to the "zero" reference potential formed by the reference branch. Since that receiver circuit of the invention which corresponds to FIG. 5 evaluates only the current, the technology of the transmitter (not represented) is not important, that is to say the transmitter may, for example, be designed with MOS technology even though the receiver is bipolar. Furthermore, the nature of the supply voltage of the transmitter (for example 5 V, 3 V or 2 V) has no effect and the GND potential of the transmitter may differ within certain limits from the GND potential of the receiver without affecting the signal processing, so long as the difference between the various GND potentials does not fluctuate with time, that is to say there is no "hum" between the potentials. Owing to the current evaluation, only one line is required, since it is permissible for potential differences between the GND potentials to occur. It is therefore also possible to use the circuit as an interface between circuits with different supply voltages.

In general, the circuits described can be used for a chip-to-chip connection, for connections on (that is to say within) a chip and for analog circuits. The branches described, that is to say the signal branch, the mirror branch and the reference branch, of the embodiments of the circuit according to the invention must be identical from the point of view of fabrication technology. In this case, it is important for each of the upper and each of lower transistors, as well as each of the upper and each of lower negative-feedback resistors, to be identical. In contrast, the upper transistors may differ from the lower transistors and, accordingly, the upper negative-feedback resistors may differ from the lower negative-feedback resistors, in order to increase the symmetry of the circuit, as has been discussed above.

I claim:

1. Receiver circuit with constant input impedance comprising a signal branch having a first transistor T1 and a second transistor T2, said first transistor in common base configuration, the base of which is supplied with a constant voltage, and a load resistor $R_L$ connected between a collector of said first transistor T1 and an upper potential Vdd for producing at said collector of said first transistor a voltage output signal, wherein an input signal Iin is applied to an emitter of said first transistor, wherein for achieving said constant input impedance, an emitter-collector path associated with said second transistor T2 is connected between the first transistor and a lower potential GND, and wherein the base voltage of said first transistor is kept constant by a mirror branch circuit comprising a third transistor T3 and a fourth transistor T4, each of said transistors T1–T4 of the same type, said third transistor having a base coupled to said base of said first transistor, said base of said third transistor being directly coupled to a collector of said third transistor, and wherein an emitter-collector path associated with said fourth transistor T4 is connected between the third transistor and said lower potential GND.

2. The receiver circuit according to claim 1, wherein each of said transistors T1–T4 is a bipolar transistor.

3. The receiver circuit according to claim 1, wherein said first and second transistors have the same dimensions, the emitter of the second transistor being at the lower potential GND and the second transistor being connected as a diode.

4. The receiver circuit according to claim 1, wherein said signal branch further comprises two negative-feedback resistors ($R_1$, $R_2$) connected between said first and second transistors such that said negative feedback resistors are coupled between the emitter of the first transistor and the collector of the second transistor, the signal input ($I_{IN}$) being located between the two negative-feedback resistors ($R_1$, $R_2$).

5. The receiver circuit according to claim 1, wherein said mirror branch further comprises negative feedback resistors $R_3$ and $R_4$ coupled between said third and fourth transistors, said mirror branch indicative of a copy of the signal branch whereby the base voltage of the first transistor is kept constant according to the current-mirror principle.

6. The receiver circuit according to claim 4, wherein said negative-feedback resistors ($R_1$, $R_2$) have approximately the same resistance.

7. The receiver circuit according to claim 4, wherein said negative-feedback resistors ($R_1$, $R_2$) have different resistance values.

8. The receiver circuit according to claim 4, wherein said negative-feedback resistor $R_1$ is approximately equal to ⅔ of said input impedance value.

9. The receiver circuit according to claim 1, further comprising an absolute temperature associated with said receiver circuit and a PTAT current source for producing a quiescent current ($I_O$) in said mirror branch, wherein said quiescent current is proportional to said absolute temperature.

10. The receiver circuit according to claim 5, further comprising a reference branch circuit indicative of a copy of said signal branch arranged between the signal branch and mirror branch circuits, said reference branch comprising a fifth and sixth transistors (T5, T6) and two resistors $R_5$, $R_6$ wherein a base associated with said fifth transistor of said reference branch is kept at a constant voltage and wherein said voltage output signal is tapped between the two collectors of said first and fifth transistors of the signal and reference branches respectively, and wherein each of said collectors of said first and fifth transistors are connected to said upper potential via a respective load resistor.

11. Receiver circuit with constant input impedance comprising a signal branch circuit having a first MOS transistor M1 and a second MOS transistor M2, said first MOS transistor in common gate configuration, the gate of which is supplied with a constant voltage, and a load resistor $R_L$ connected between a source of said first MOS transistor M1 and an upper potential Vdd for producing at said source of said first MOS transistor a voltage output signal Uout, and wherein an input signal Iin is applied to a drain of said first MOS transistor, wherein for achieving said constant input impedance, a source-drain path associated with said second MOS transistor M2 is connected between the first MOS transistor and a lower potential GND, and wherein the gate voltage of said first MOS transistor is kept constant by a mirror branch circuit comprising a third MOS transistor M3 and a fourth MOS transistor M4, said third MOS transistor having a gate coupled to said gate of said first MOS transistor, said gate of said third MOS transistor being directly coupled to a source of said third MOS transistor, and wherein a source-drain path associated with said fourth MOS transistor M4 is connected between the third transistor and said lower potential GND.

12. The receiver circuit according to claim 11, wherein said signal branch circuit further comprising two negative-feedback resistors $R_1$, $R_2$, coupled between said first and second MOS transistors, wherein said resistor $R_1$ is coupled at a first terminal to the drain of said first MOS transistor and said resistor $R_2$ is coupled at a first terminal to the source of said second MOS transistor, the signal input $I_{IN}$ being located between said two negative-feedback transistors $R_1$, $R_2$, and wherein said mirror branch circuit further comprises negative-feedback resistors $R_3$, $R_4$ coupled between said third and fourth MOS transistors.

13. The receiver circuit according to claim 12, wherein said negative-feedback resistors $R_1$, $R_2$ have approximately the same resistance.

14. The receiver circuit according to claim 12, wherein said negative-feedback resistors $R_1$, $R_2$ have different resistance values.

15. The receiver circuit according to claim 11, further comprising an absolute temperature associated with said receiver circuit and a PTAT current source for producing a quiescent current ($I_O$) in said mirror branch, wherein said quiescent current is proportional to said absolute temperature.

16. The receiver circuit according to claim 12, further comprising an amplifier with a reference resistor $R_{ref}$ and a reference voltage $U_{ref}$ for controlling the quiescent current $1_O$, such that the equation $U_O = U_{ref} + R_{ref} \times I_O$ is satisfied, where $U_O$ is the potential difference between the gate of MOS transistor M3 and the lower potential GND.

17. The receiver circuit according to claim 16, wherein said amplifier comprises a differential amplifier.

* * * * *